(12) United States Patent
Makowsky (10) Patent No.: US 12,377,477 B2
(45) Date of Patent: Aug. 5, 2025

(54) COLLAPSIBLE HAND SAW WITH TUBULAR FRAME DOUBLING AS STORAGE CONTAINER FOR OTHER COMPONENTS

(71) Applicant: Gordon N. Makowsky, Kenora (CA)

(72) Inventor: Gordon N. Makowsky, Kenora (CA)

( * ) Notice: Subject to any disclaimer, the term of this patent is extended or adjusted under 35 U.S.C. 154(b) by 472 days.

(21) Appl. No.: 17/871,057

(22) Filed: Jul. 22, 2022

(65) Prior Publication Data

US 2023/0012283 A1    Jan. 12, 2023

Related U.S. Application Data

(60) Provisional application No. 63/226,445, filed on Jul. 28, 2021.

(51) Int. Cl.
*B23D 51/03*    (2006.01)
*B27B 21/02*    (2006.01)

(52) U.S. Cl.
CPC .............. *B23D 51/03* (2013.01); *B27B 21/02* (2013.01)

(58) Field of Classification Search
CPC ......... B27B 21/02; B27B 21/06; B23D 51/00; B23D 51/01; B23D 51/03; B23D 51/10; B23D 51/125; B23D 49/00; B23D 49/02; B23D 49/04; B23D 49/06; B23D 49/12; B23D 49/125
USPC ........................... 30/506, 507, 512, 513, 514
See application file for complete search history.

(56) References Cited

U.S. PATENT DOCUMENTS

| | | | | |
|---|---|---|---|---|
| 15,220 A | * | 7/1856 | Clapp ................. | B23D 51/125 30/506 |
| 116,490 A | * | 6/1871 | Roberts ................ | B23D 51/125 30/506 |
| 118,233 A | * | 8/1871 | Hankin ................ | B23D 51/125 30/506 |
| 159,562 A | * | 2/1875 | Clemson .............. | B23D 51/125 30/506 |
| 178,985 A | * | 6/1876 | Atkins ................. | B23D 51/125 30/506 |

(Continued)

FOREIGN PATENT DOCUMENTS

| | | | |
|---|---|---|---|
| DE | 9404066 U1 * | 5/1994 | ............. B23D 51/03 |
| FR | 444935 A * | 10/1912 | ............. B23D 51/03 |

(Continued)

*Primary Examiner* — Jason Daniel Prone
(74) *Attorney, Agent, or Firm* — Kyle R Satterthwaite; Ryan W Dupuis; Ade & Company Inc.

(57) ABSTRACT

A collapsible hand saw features an elongated tubular frame member with a hollow interior that runs longitudinally therethrough. First and second arms are removably engaged to the tubular frame near first and second ends of thereof, to span outward from an underside thereof in a common direction. Each arm, near a distal mounting end thereof is configured for selective coupling to a bowsaw blade at a respective mounting hole therein near a respective end thereof. An adjustable tensioner is connectable between the frame member and the first arm, and when tightened, pulls the respective mounting end of said first arm away from the second arm and toward the first end of the frame member to tension the blade. The hollow interior of the frame member accommodates simultaneous storage therein of at least the first and second arms, the adjustable tensioner, and one or multiple blades.

18 Claims, 6 Drawing Sheets

(56) References Cited

U.S. PATENT DOCUMENTS

| | | | | |
|---|---|---|---|---|
| 281,837 A * | 7/1883 | Clemson | B23D 51/125 | 30/506 |
| 559,309 A * | 4/1896 | Redfield | B23D 51/125 | 30/506 |
| 774,780 A * | 11/1904 | Remington | B23D 51/125 | 30/506 |
| 791,513 A * | 6/1905 | Toles | B23D 51/125 | 30/506 |
| 831,662 A * | 9/1906 | Gives | B23D 51/125 | 30/506 |
| 914,833 A * | 3/1909 | Hemmer | B23D 51/125 | 30/506 |
| 923,543 A * | 6/1909 | Luzzatti | B23D 51/125 | 30/506 |
| 1,380,628 A * | 6/1921 | Barner | B23D 51/03 | 30/512 |
| 1,387,274 A * | 8/1921 | Killian | B23D 51/01 | 30/520 |
| 1,473,468 A * | 11/1923 | Cote | B27B 21/06 | 30/506 |
| 1,484,168 A * | 2/1924 | Bertas et al. | B23D 51/125 | 30/507 |
| 1,610,381 A * | 12/1926 | Jacobey | B23D 49/12 | 30/510 |
| 1,663,076 A * | 3/1928 | Garner | B23D 51/125 | 30/506 |
| 2,018,437 A * | 10/1935 | Burkhardt | B27B 21/02 | 30/506 |
| 2,332,545 A * | 10/1943 | Acomb | B23D 49/12 | 30/513 |
| 2,399,541 A * | 4/1946 | Clark | B27B 21/02 | 30/506 |
| 2,595,288 A * | 5/1952 | Peters | B23D 49/12 | 30/512 |
| 2,606,585 A * | 8/1952 | Collura | B23D 49/12 | 30/513 |
| 2,796,098 A * | 6/1957 | Dreier | B23D 51/03 | 30/506 |
| 2,808,086 A * | 10/1957 | Dreier | B23D 51/125 | 30/506 |
| 2,910,101 A * | 10/1959 | Canfield | B23D 51/03 | 30/506 |
| 2,930,420 A * | 3/1960 | Brion | B23D 51/03 | 30/512 |
| 3,250,307 A * | 5/1966 | Schmidt et al. | B23D 51/03 | 30/512 |
| 3,327,748 A * | 6/1967 | Reuterfors | B23D 51/03 | 30/513 |
| 3,724,519 A * | 4/1973 | McCord, Jr. | B23D 51/03 | 30/512 |
| 3,905,409 A * | 9/1975 | Bradley | B23D 51/03 | 30/512 |
| 3,908,726 A * | 9/1975 | Swenson | B23D 51/03 | 30/512 |
| 3,954,127 A * | 5/1976 | Doxon | B23D 51/03 | 30/506 |
| 4,499,936 A * | 2/1985 | Nilsson | B23D 51/03 | 30/512 |
| 4,779,345 A * | 10/1988 | Pooley | B23D 51/03 | 30/512 |
| 5,067,190 A * | 11/1991 | Gagnon | B25F 1/02 | 30/308.3 |
| 5,074,002 A * | 12/1991 | Huang | B23D 51/03 | 30/512 |
| 5,208,986 A * | 5/1993 | Ryon | B23D 51/03 | 30/512 |
| 5,706,585 A * | 1/1998 | Wang | B23D 51/03 | 30/512 |
| 5,826,344 A * | 10/1998 | Phelon | B23D 51/125 | 30/506 |
| 6,134,791 A * | 10/2000 | Huang | B23D 51/01 | 30/506 |
| 6,298,564 B1 * | 10/2001 | Voser | B23D 51/03 | 30/512 |
| 6,820,341 B2 * | 11/2004 | Snider | B23D 51/03 | 30/513 |
| 6,898,858 B1 * | 5/2005 | Spell | B23D 51/03 | 30/512 |
| 8,266,806 B2 * | 9/2012 | Holmroos | B23D 51/03 | 30/512 |
| 9,623,499 B2 * | 4/2017 | Beck | B23D 51/03 | |
| 2004/0020062 A1 * | 2/2004 | Ducret | B23D 51/03 | 30/512 |
| 2009/0113729 A1 * | 5/2009 | Chen | B23D 51/125 | 30/513 |
| 2022/0226915 A1 * | 7/2022 | Kern | B23D 51/03 | |

FOREIGN PATENT DOCUMENTS

| | | | | |
|---|---|---|---|---|
| FR | 2663574 A1 * | 12/1991 | | B23D 51/01 |
| GB | 1230497 A * | 5/1971 | | B23D 51/03 |

* cited by examiner

COLLAPSIBLE HAND SAW WITH TUBULAR FRAME DOUBLING AS STORAGE CONTAINER FOR OTHER COMPONENTS

CROSS-REFERENCE TO RELATED APPLICATIONS

This application claims benefit under 35 U.S.C. 119(e) of U.S. Provisional Application No. 63/226,445, filed Jul. 28, 2021, the entirety of which is incorporated herein by reference.

FIELD OF THE INVENTION

The present invention relates generally to tools, and more particularly to collapsible hand saws that be assembled into a working state ready for use, and disassembled into a more compact collapsed state for transport and storage.

BACKGROUND

The prior art includes collapsible hand saws of capable of the aforementioned transformation between working and collapsed states, though to the best of Applicant's knowledge, none of those designs teach or suggest the novel collapsible hand saw that is disclosed herein below.

SUMMARY OF THE INVENTION

According to one aspect of the invention, there is provided a collapsible hand saw comprising:
  an elongated tubular frame member having a first end and a second end situated oppositely of one another in a longitudinal direction of said frame member, a hollow interior that runs longitudinally therethrough, and first and second predefined attachment features defined on said elongated tubular frame member at respective first and second locations situated respectively proximate the first and second ends of the frame member;
  a first arm for attachment to the elongated tubular frame at the first location in an installed position spanning outward therefrom at an underside thereof, said first arm having a respective attachment end at or adjacent which said first arm is configured for engagement to the frame member at the first attachment feature thereof, and a respective mounting end at or adjacent which said first arm is configured for selective coupling to a bowsaw blade at a respective mounting hole therein near a respective first end thereof;
  a second arm for attachment to the elongated tubular frame at the second location in an installed position spanning outward therefrom at the underside thereof, said second arm having a respective attachment end at or adjacent which said second arm is configured for engagement to the frame member at the second attachment feature thereof, and a respective mounting end at or adjacent which said second arm is configured for selective coupling to a bowsaw blade at a respective mounting hole therein near a respective second end thereof; and
  an adjustable tensioner connectable between the frame member and the first arm in a position that, when tightened, pulls the respective mounting end of said first arm away from the second arm and toward the first end of the frame member to tension the bowsaw blade;
  wherein the interior space of the frame member is sufficiently sized to accommodate simultaneous storage therein of at least the first and second arms, and the adjustable tensioner.

According to another aspect of the invention, there is provided a collapsible hand saw comprising:
  an elongated tubular frame member having a first end and a second end situated oppositely of one another in a longitudinal direction of said frame member, and a hollow interior that runs longitudinally therethrough;
  a first pair of holes in said elongated tubular frame at a first location proximate the first end thereof, said first pair of holes comprising a first top hole in a topside of said elongated tubular frame and a first bottom hole in an opposing underside of said elongated tubular frame;
  a second pair of holes in said elongated tubular frame at a second location proximate the second end thereof, said second pair of holes comprising a second top hole in the topside of said elongated tubular frame and a second bottom hole in the opposing underside of said elongated tubular frame;
  a first arm for attachment to the elongated tubular frame at the first location in an installed position spanning outward therefrom at the underside thereof through the first bottom hole, said first arm having a respective attachment end that is insertable through said first bottom hole, and at or adjacent which said first arm is configured for hooked engagement with the frame member at a boundary edge of the first top hole therein, and a respective mounting end at or adjacent which said first arm is configured for selective coupling to a bowsaw blade at a respective mounting hole therein near a respective first end thereof;
  a second arm for attachment to the elongated tubular frame at the second location in an installed position spanning outward therefrom at the underside thereof through said second bottom hole, said second arm having a respective attachment end that is insertable through said second bottom hole, and at or adjacent which said second arm is configured for hooked engagement with the frame member at a boundary edge of the second top hole therein, and a respective mounting end at or adjacent which said second arm is configured for selective coupling to the bowsaw blade at a respective mounting hole therein near a respective second end thereof; and
  an adjustable tensioner connectable between the frame member and the first arm in a position that, when tightened, pulls the respective mounting end of first arm away from the second arm and toward the first end of the frame member to tension the bowsaw blade;
  wherein the interior space of the frame member is sufficiently sized to accommodate simultaneous storage therein of at least the first and second arms and the adjustable tensioner.

BRIEF DESCRIPTION OF THE DRAWINGS

Preferred embodiments of the invention will now be described in conjunction with the accompanying drawings in which.

DETAILED DESCRIPTION

The drawings illustrate one embodiment of a novel design for a collapsible hand saw of the present invention, which also may be referred to as a "tube saw", for reasons that will become apparent from the following description. Any and all dimensions shown in figures are intended as non-limiting examples only, without limitation on the scope of the claimed invention.

Figure 1:
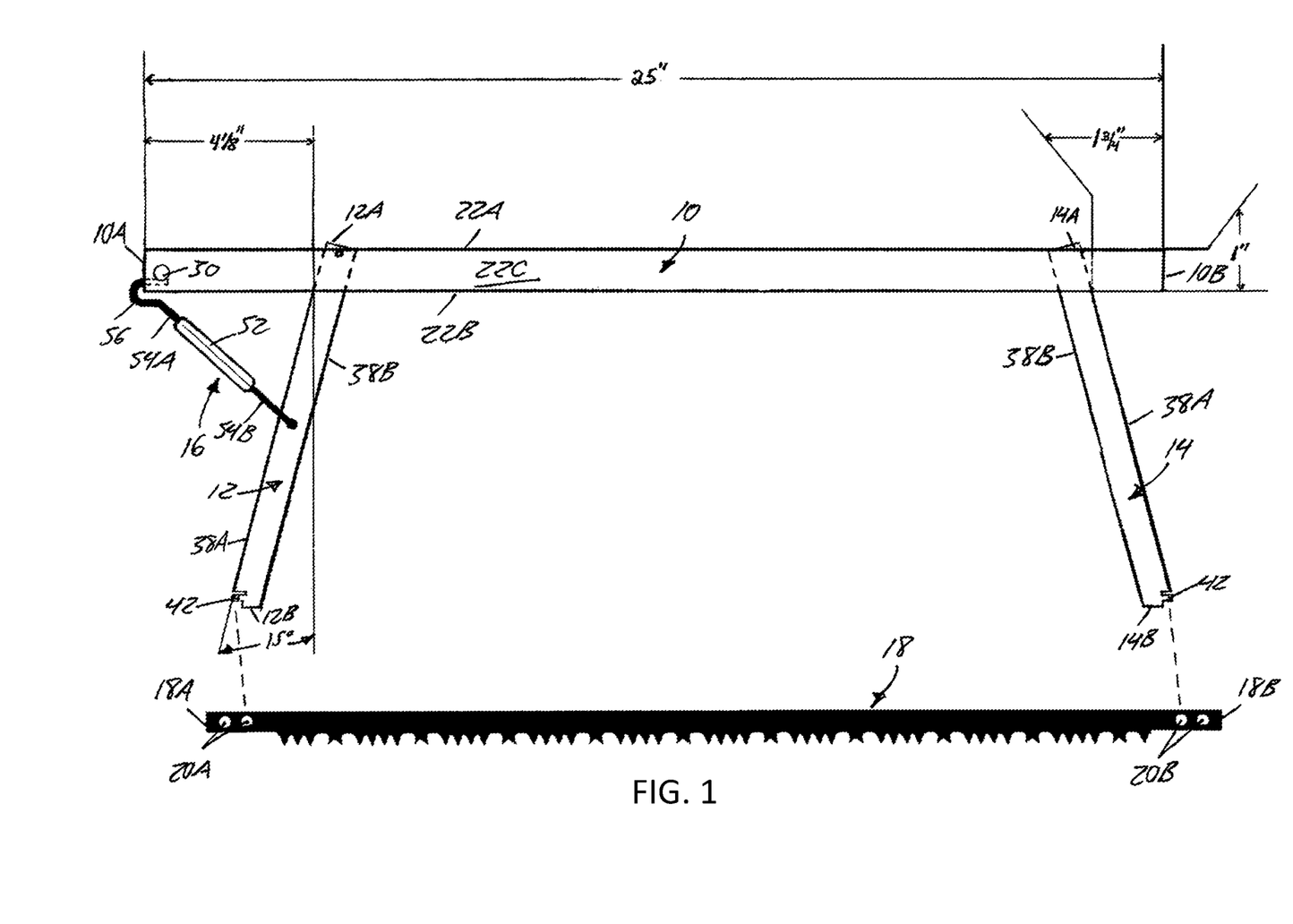
FIG. 1 is a side elevational view of a collapsible hand saw according to one embodiment the present invention, and shown in a partially assembled state ready for final installation of a bowsaw blade thereon.
Figure 2:
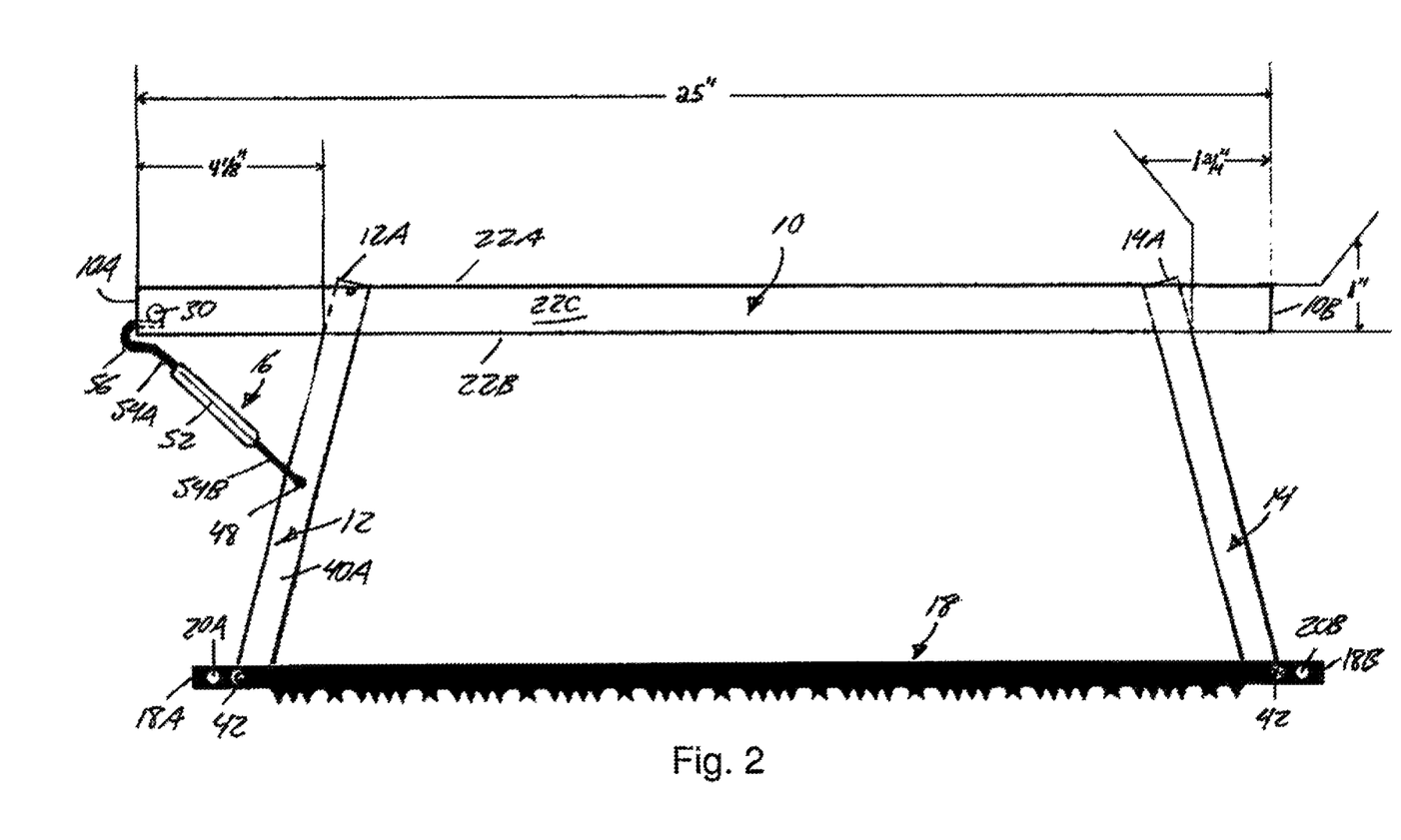
FIG. 2 is a side elevational view of the collapsible hand saw with the blade installed, and showing a reference position of saw.

Referring initially to FIGS. 1 and 2, the saw is composed of primarily of an elongated tubular frame member 10 made of rectangular tubing, for example made of mild steel; a first arm 12 selectively attachable to the frame member 10 at a first predefined attachment location situated near, but spaced longitudinally inward from, a first end 10A of the frame member 10; a similar second arm 14 selectively attachable to the frame member 10 at a second predefined attachment location situated near, but spaced longitudinally inward from, an opposing second end 10B of the frame member 10; an adjustable tensioner 16 selectively connectable between the frame member 10 and a predefined connection point on the first arm 12; and an elongated conventional saw blade 18 of the type commonly employed for a bucksaw or bowsaw, and thus having a pair of mounting holes 20A, 20B in the blade near each of the blade's two ends 18A, 18B. The first and second arms 12, 14 in the illustrated example are made of flat metal bar stock, and the tensioner 16 is composed of a slightly modified, but otherwise conventional, turnbuckle, as described in more detail below.

The four walls of the frame member's rectangular tubing include a top wall 22A denoting a topside of the frame member 10 in the reference position of FIG. 2, an opposing bottom wall 22B denoting an opposing underside of the frame member 10 in said reference position, and two side walls 22C, 22D denoting opposing front and rear sides of the frame member 10. The four walls collectively delimit a hollow interior of the frame member 10 that runs in a longitudinal direction in which the first and second ends 10A, 10B of the frame member 10 are spaced apart in opposing relation to one another. At the second end 10B of the frame member, the hollow interior thereof is capped or closed off, for example by a butt plate 24 that may be created by bending an integral extension of one of the tubing's walls 22D. The extension is cut on three sides, and then, as schematically shown in broken lines in FIG. 3D, is bent into perpendicular relation to the remainder of that wall 22D to thereby close off the second end 10B of the tubular frame member 10.

Figure 3A:
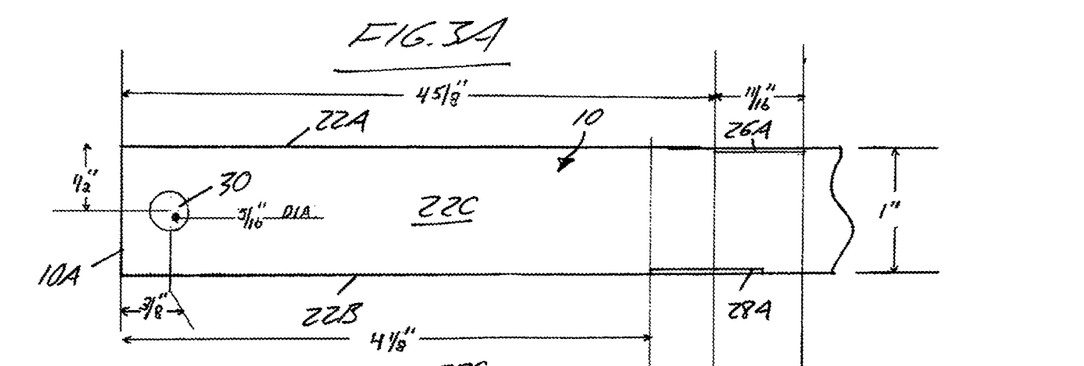
FIGS. 3A and 3B are partial side elevational and bottom plan views of a tubular frame member of the collapsible saw at a first end thereof.
Figure 3B:
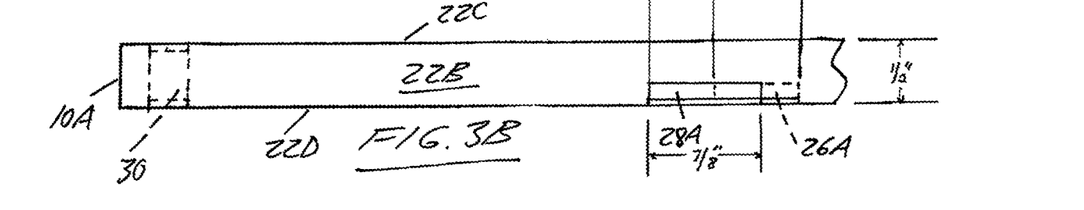

With reference to FIGS. 3A & 3B, a first pair of slot-shaped holes are provided in the top and bottom walls 22A, 22B of the frame member 10 at the first predefined attachment location. Of these two slot-shaped holes, a top hole 26A is cut in the top wall 22A of the frame member 10, and a bottom hole 28A is cut in the bottom wall 22B of the frame member 10. In the longitudinal direction of the frame member 10, the top and bottom holes 26A, 28A are offset from one another, with the bottom hole 28A being closer to the first end 10A of the frame member 10 than the top hole 26A. In a transverse width direction of the frame member, in which the front and rear side walls 22C, 22D are spaced from one another, the top and bottom holes 26A, 28A are aligned, for example both residing adjacent to the rear wall 22D in the illustrated, but non-limiting, example. Each slot-shaped hole 26A, 28A is elongated in the longitudinal direction of the frame member 10. The bottom hole 28A has a length in this direction that slightly exceeds a width of the first arm 12, and both the top and bottom holes 26A, 28A have a width in the frame member's transverse width direction that slightly exceeds a thickness of the first arm 12. The top attachment end 12A of the first arm 12 is insertable upwardly into the hollow interior of the tubular member 10 through the bottom hole 28A, and onward into a position reaching into the top hole 26A. The length of the top hole need not exceed the full width of the first arm, and thus may be shorter than the bottom hole, as shown in the illustrated example.

Figure 3C:
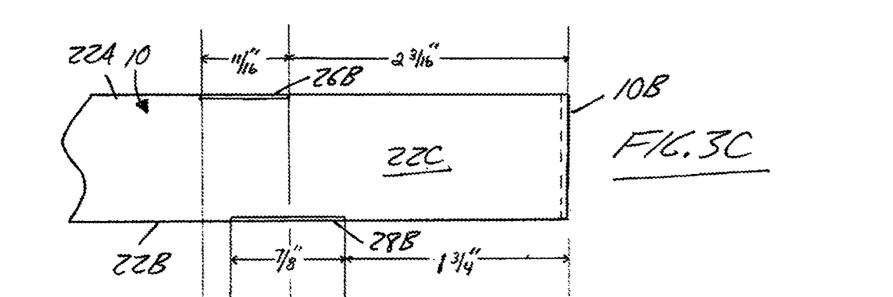
FIGS. 3C and 3D are partial side elevational and bottom plan views of the tubular frame member of the collapsible saw at a second end thereof.
Figure 3D:
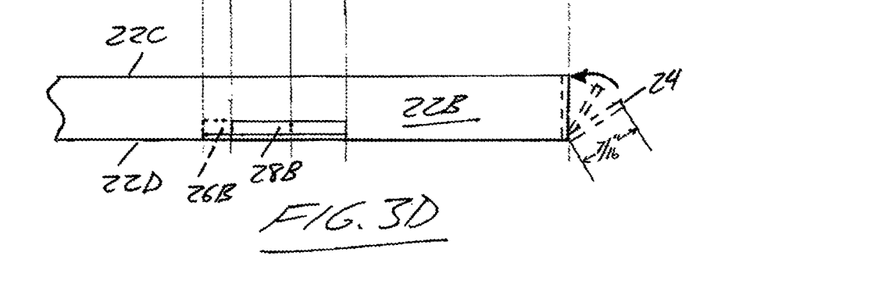

With reference to FIGS. 3C & 3D, a matching second pair of slot-shaped holes are provided in the top and bottom walls 22A, 22B of the frame member 10 at the second predefined attachment location. Like in the first pair, the top hole 26B is cut in the top wall 22A of the frame member 10, and the bottom hole 28B is cut in the bottom wall 22B of the frame member 10. The top and bottom holes 26B, 28B of the second pair are again longitudinally offset from one another, with the bottom hole 28B being closer to the second end 10B of the frame member 10 than the top hole 26B. In the transverse width direction of the frame member, the top and bottom holes 26B, 28B of the second pair are again aligned, both with one another and with the first pair of holes 26A, 28A, thus again residing adjacent to the rear wall 22D in the illustrated but non-limiting example. The dimensions of the second pair of holes preferably match the first pair, and preferably have the same relative relationship to the dimensions of the second arm 14, which preferably has matching dimensions to the first arm 12.

Figure 7:
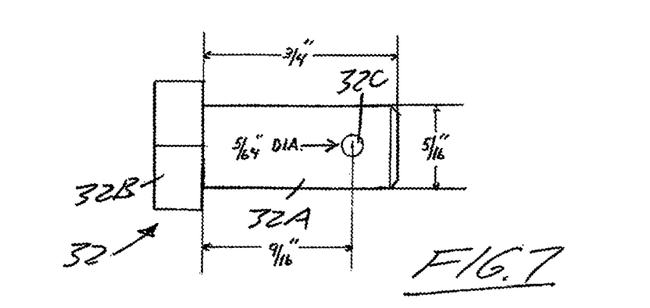
FIG. 7 is a side view of a stop bolt co-operable with the tubular frame member to store other components (arms, tensioner, & saw blade) in a hollow interior of the frame member when the saw is collapsed for storage or transport.

Unlike the closed-off second end 10B of the frame member 10, the first end 10A thereof is left open to enable insertion of the other primary components of the saw (arms 12, 14; tensioner 16 and blade 18) into the hollow interior of the tubular frame member 10 for storage when the saw is disassembled. For use in securely retaining the stored components within the tubular frame member 10, a cross-bore 30 penetrates through the front and rear walls 22C, 22D near the first end 10A of the frame member 10, and more particularly at a location nearer thereto than the first pair of slot-shaped holes 26A, 28A. This cross-bore 30 is sized to receive insertion of a stop pin 32 (FIG. 7) through the cross-bore 30 into a blocking position spanning across the frame member's hollow interior, whereby the inserted stop pin 32 obstructs the open first end 10A of the frame member 10. As shown in FIG. 7, the stop pin 32 features a shaft 32A with an enlarged head 32B at one end, and a diametrical bore 32C near the other end for selective receipt of a spring clip (not shown). So, in the stop pin's blocking position, the head 32B thereof resides externally of a first one of either the front or rear wall 22C, 22D of the frame member 10, and the diametrical bore 32C receives the spring clip externally of the other one of either the front or rear wall 22C, 22D of the frame member 10, whereby the head 32B and spring clip cooperatively constrain the stop pin within the cross-bore, thereby maintaining obstruction of the frame member's open end 10A.

Figures 4A, 4B, 4C, 4D:
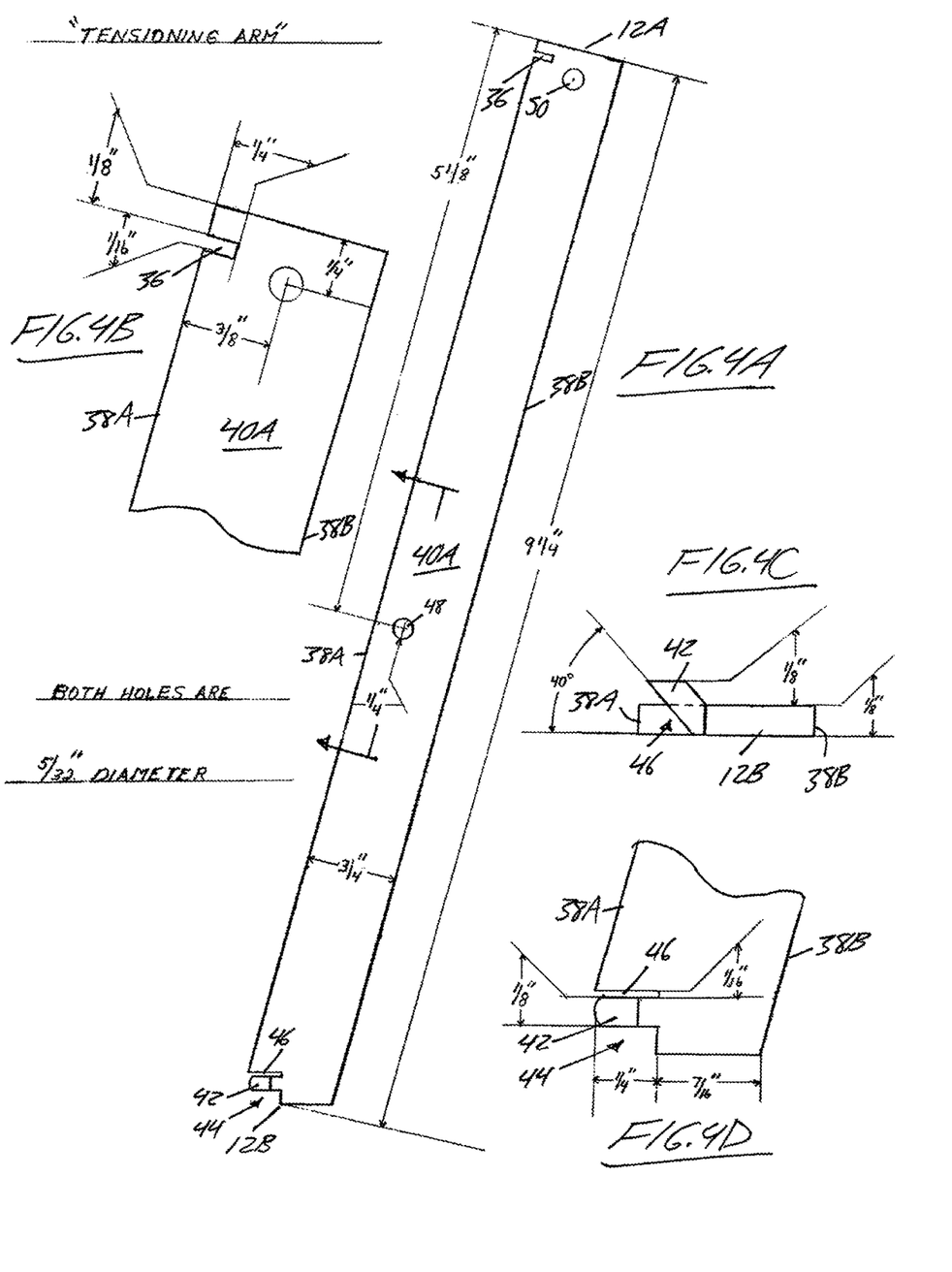
FIG. 4A is a side elevational view of a first arm of the collapsible saw.
FIG. 4B is a partial side elevational view of the first arm at an upper frame-attachment end thereof.
FIG. 4C is an end view of the first arm at a lower blade-mounting end thereof.
FIG. 4D is a partial side elevational view of the first arm at the lower blade-mounting end thereof.

FIG. 4 illustrates the first arm 12, which features a small engagement slot 36 near a top attachment end 12A thereof in an outer edge 38A of the arm 12 that faces toward the first end 10A of the frame member 10 in the assembled state of the saw. This engagement slot 36 is sized for hooked engagement over a boundary edge of the first top hole 26A at the end thereof nearest the first end 10A of the frame member, thereby attaching the first arm 12 to the frame 10 in an installed position spanning across the interior space thereof, and downwardly through the first bottom hole 28A. From here, the installed first arm 12 spans outwardly from the frame member 10 at the underside thereof in cantilevered fashion.

At or near a bottom mounting end 12B, the first arm 12 features a mounting lug 42 that protrudes outwardly from the from a front face 40A of the arm 12 to engage through a respective one of the mounting holes 20A of the blade 18 near the first end 18A thereof in order to couple the blade 18 to the first arm 12. In the illustrated example, the mounting lug 42 is a seamlessly integral part of the arm's constituent metal bar. More specifically, the illustrated mounting lug 42 is formed by cutting out a corner notch 44 from the first arm 12 where the outer edge 38A of the arm 12 meets the bottom end 12A thereof, and also cutting a nearby slot 46 into the outer edge 38A of the arm 12 at a spaced distance from the corner notch 44, thereby leaving a small tang between the notch 44 and the nearby slot 46, which is then bent out of the plane of the bar to form the lug 42. As best shown in FIG. 4C, preferably the tang is bent at an obliquely acute angle so that the resulting lug 42 slopes toward the outer edge 38A of the first arm, whereby tensioning of the blade 18 will serve to force the blade 18 tighter against the front face 40A of the arm 12 to best ensure the blade cannot inadvertently slide off the lug 42 during use.

The second arm 14 includes the same forgoing features as the first arm 12. The second arm thus has a respective engagement slot 36 in an outer edge 38A of the arm 14 near a top attachment end 14A thereof for hooked engagement of this slot 36 over a boundary edge of the second top hole 26B at the end thereof nearest the second end 10B of the frame member, and a mounting lug 42 that protrudes outwardly from the from the front face 40A of the arm 14 to engage through a respective one of the mounting holes 20B of the blade 18 near the second end 18A to couple the blade 18 to the second arm 14. The second arm 14 is thus attachable to the frame 10 in an installed position spanning across the interior space thereof, and downwardly through the second bottom hole 28B. From here, the installed second arm 14 spans outwardly from the frame member 10 at the underside thereof in cantilevered fashion. Accordingly, the two installed arms 12, 14 extend from the frame member 10 at the same side (underside) thereof to support the blade 18 in a position spanning between the bottom mounting ends 12B, 14B of the arms 12, 14 at a spaced distance form the frame member 10.

For cooperation with the tensioner 16 during preparation and use of the saw, the first arm 12 includes additional features that may be omitted from the second arm 14. At an intermediate location between the top attachment end 12A of the first arm 12 and the opposing bottom blade-mounting end 12B thereof, the first arm 12 features a first hooking aperture 48 that penetrates through the front and rear faces 40A, 40B of the first arm 12 to serve as a first predefined tensioner-connection point at which the tensioner 16 is selectively connectable to the first arm 12. Also for cooperation with the tensioner 16, but during collapsed storage of the saw, the first arm 12 also includes a second hooking aperture 50 situated closely adjacent to the top attachment end 12A of the of the first arm 12 to serve as a second predefined tensioner-connection point at which the tensioner 16 is selectively connectable to the first arm 12.

Figure 6:
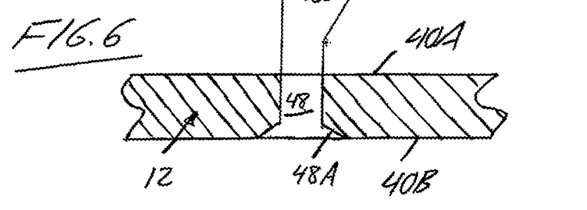
FIG. 6 is a partial cross-sectional view of the first arm, as viewed along line A-A of FIG. 4A.

As shown in FIG. 6, the first hooking aperture 48 includes a beveled countersink 48A at one end thereof to improve hooked retention between the tensioner 16 and the first arm 12, particularly by resisting vibrationally induced unhooking thereof during use of the saw. In the illustrated embodiment, where the holes 26A, 26B, 28A, 28B in the frame member 10 reside adjacent the rear wall 22D thereof, the tensioner 16 is hooked to the first arm 12 from the front face 40A thereof, and the beveled countersink 48A is thus provided at the opposing rear face 40B of the first arm, though the countersink location would be reversed to the front face of the arm 12 if the holes in the frame member for receiving the arms 12, 14 were instead situated adjacent the front wall 22C of the frame member 10.

Figure 5:
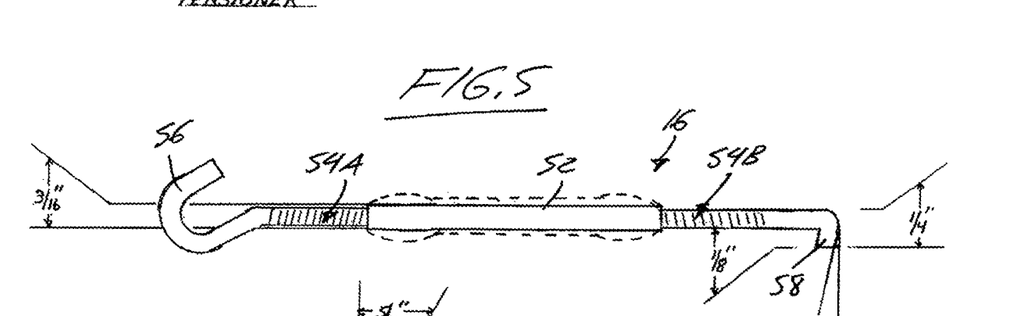
FIG. 5 is a side view of an adjustable tensioner of the collapsible hand saw.

The tensioner 16 of the illustrated embodiment is a modified turnbuckle that, like a conventional turnbuckle, has a central body 52 with two externally threaded shafts 54A, 54B that respectively extend from longitudinally opposing ends of the body 52 through respective internally threaded bores thereof. Accordingly, in known fashion, rotation between the central body 52 and either shaft 54A, 54B is operable to change the shaft's protruding distance form the respective end of the body 52, thereby changing the overall length of the tensioner. The first shaft 54A features a conventional rounded hook 56 that curves back over itself at the first shaft's distal end, but the second shaft 54B has instead been modified to feature a truncated stub hook 58 that juts only a short distance outward to one side of the second shaft 54B at the distal end thereof. This shorted stub hook lacks the 180-degree arc shape of the larger rounded hook 56 at the opposing end of the tensioner. On the other hand, the stub hook 58 does preferably still possess a slight hook angle, for example being bent approximately 10 degrees out of perpendicular relationship to the second shaft 54B, specifically in a direction angling back toward the central body 52 in order to more effectively maintain hooked engagement with the first hooking aperture 48 of the first arm 12 when engaged therewith.

The thickness of each arm 12, 14, as measured between the front and rear faces 40A, 40B thereof, is less than the width of the frame member's hollow interior, as measured between the front and rear walls 22C, 22D thereof. Likewise, the width of each arm, as measured between the outer and inner edges 38A, 38B thereof, is less than the height of the frame member's hollow interior, as measured between the top and bottom walls 22A, 22B thereof, whereby each arm 12, 14 is insertable into the hollow interior of the frame member in a width-upright orientation through the open end 10A of the frame member 10 when the stop pin 32 is removed from the cross-bore 30. Likewise, a thickness (smallest dimension) of the tensioner's body 52 is less than the width of the frame member's interior, and both a width (second smallest dimension) of the tensioner's body and a width of the rounded hook 56 at the widest point thereof are each less than the height of the frame member's interior, likewise making the tensioner 16 insertable into the hollow interior of the frame member in width-upright orientation through the frame member's open end 10A.

Figures 8, 9:
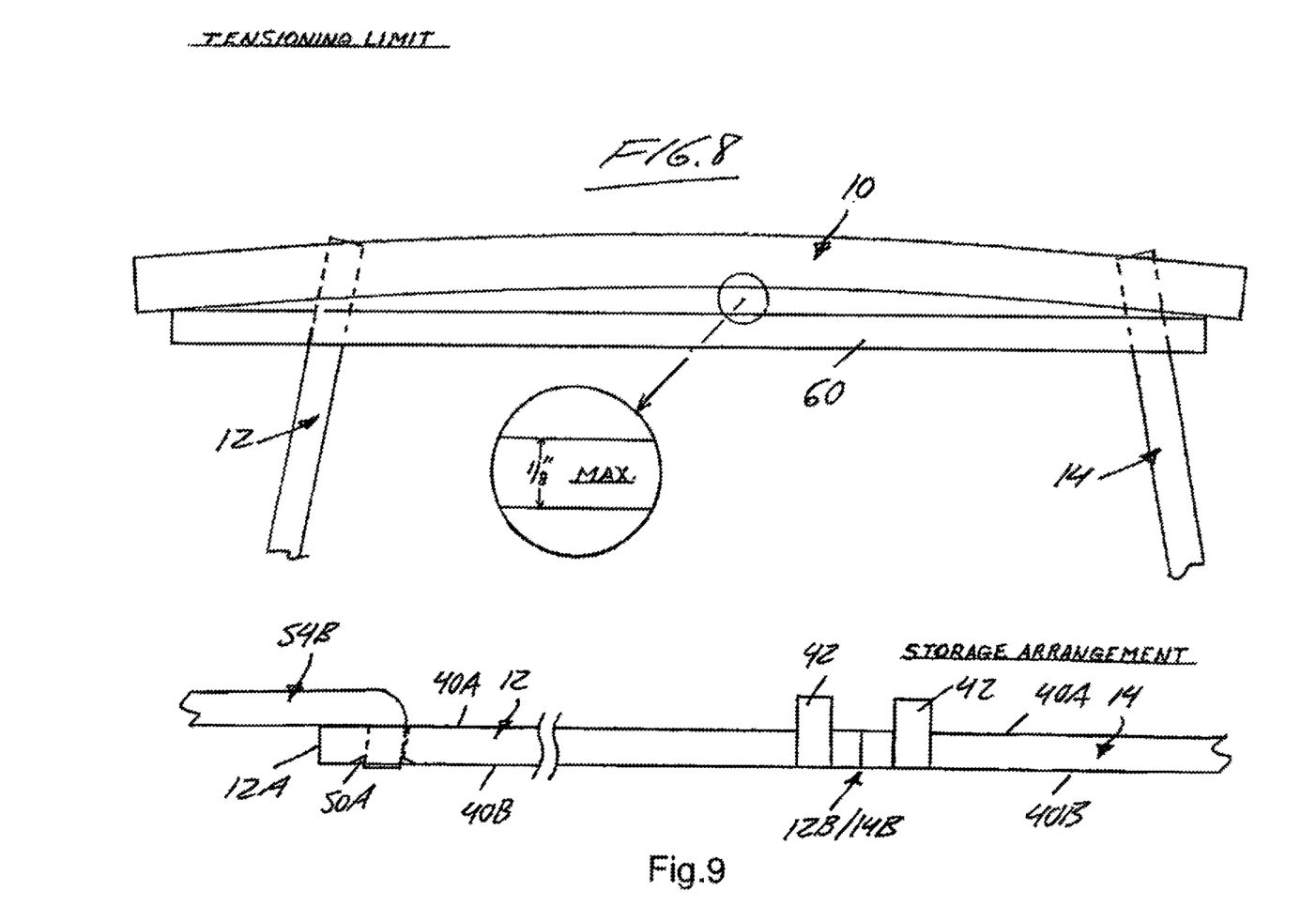
FIG. 8 is a is a simplified partial side elevational view of the of the collapsible hand saw of FIG. 2, illustrating optional use of a blade protector or other straight edge to gauge a tensioned state of the saw.
FIG. 9 is a top plan view illustrating a storage arrangement of the arms and tensioner of saw blade in which they are storable within the tubular frame member.

The length of the frame member's hollow interior from the butt plate 24 to the open to the open first end 10A of the frame member 10 not only exceeds the combined length of the two arms 12, 14 when placed end-to-end, but also exceeds the combined lengths of the two arms 12, 14 and the tensioner 16, at least when the two arms 12, 14 are placed end-to-end at their bottom mounting ends 12B, 14B and the tensioner 16 is hooked to the first arm 12 at the second hooking aperture 50 thereof using the stub hook 58. This end-to-end placement of the arms 12, 14, together with hooked connection of the tensioner's stub hook 58 with the second hooking aperture 50 of the first arm 12, shown with a beveled countersink 50A, is shown in FIG. 9, and is referred to herein as a preferred storage arrangement in which these three components are all receivable in the interior space of the frame member 10 via the open first end 10A thereof for the purpose of storing said components within the frame member when the saw is not in use. The storage arrangement may be slid into the frame member 10 in a second-arm-first orientation, whereby the rounded hook 56 of the tensioner 16 resides nearest to the open first end 10A of the frame member 10, and forms a convenient pull handle by which the tensioner 16 and hooked first arm 12 can later be pulled out of the frame member 10 in preparation for assembly and use of the saw.

The height and length of the frame member's interior also exceeds the height and length of the saw blade 18, which is also stored within the frame member during non-use periods. The blade's relative thinness is accommodated by a dimensional difference by which the frame member's internal width exceeds the thickness of each support arm 12, 14 and the tensioner 16, whereby the blade 18 is storable alongside the stored arms 12, 14 and tensioner 16. Once these four components are received in the frame member's hollow interior, the stop pin 32 is inserted in the cross-bore 30 and secured with a spring clip, whereupon the stop pin 32 blocks the stored components from sliding out of the open end 10A of the frame member 10. The spring-clip may also be used to hang the collapsed saw on a hook or other suitable support when not in use.

To prepare the saw for use from this collapsed storage state, the spring clip and stop pin 32 are first removed, and the stored components are removed from the hollow interior of the tubular frame member 10. The top attachment ends 12A, 14A of the first and second arms 12, 14 are inserted upwardly through the first and second bottom holes 28A, 28B of the frame member 10, and are then hooked into engagement with the frame member at the outer ends of the first and second top holes 26, 26B, respectively. The blade 18 is then mounted onto the two arms by fitting one of the mounting holes 20A near the first end 18A of the blade over the mounting lug 42 of the first arm 12, and likewise fitting one of the mounting holes 20B near the second end 18B of the blade over the mounting lug 42 of the second arm 14. The distance between the blade's first hole pair 20A and second hole pair 20B exceeds the distance between the frame member's first hole pair 26A, 28A and second hole pair 26B, 28B, whereby this fitting of the blade onto the two arms 12, 14 involves pushing the bottom blade-mounting ends 12B, 14B of the arms 12, 14 apart so that the two installed arms are of divergent relationship to one another in a direction moving away from the frame member. The bottom ends 12B, 14B of the arms 12, 14 that support the blade 18 are therefore further apart from one another than top ends 12A, 12B of the arms that attach to the frame member.

The tensioner 16 is installed by engaging its rounded hook 56 to the frame member at or near the first end 10A thereof, in the illustrated example by hooking the rounded hook 56 into the open first end 10A of the frame member, and by engaging the tensioner's opposing stub hook 58 into the first hooking aperture 48 of the first arm 12. The tensioner 16 is then tightened, which thereby pulls the bottom mounting end 12B of the first arm 12 toward the first end 10A of the frame member, and thereby tensions the blade 18 between the two arms 12, 14. With reference to FIG. 8, the tubular frame member 10 adopts a slightly bowed shape under such tensioning, and the degree of bowing may be used as a gauge by which to determine whether the saw has been appropriately tensioned or over-tensioned. Bowsaw blades are typically packaged in a blade protector sleeve 60, which can optionally be used as a straight-edge placed along the underside of the frame member 10, as shown in FIG. 8, so that measurement of the maximum gap between the blade protector sleeve 60 and the bowed frame member 10 can be used to gauge whether the amount of applied tension is appropriate, for example by ensuring that a predetermined gap limit (e.g. ⅛-inch) hasn't been exceeded. If the saw is left assembled when not in use, rather than being disassembled to the collapsed state, then care should be taken to remove the tension to allow the tubular frame member 10 to relax and void memory damage.

In the foregoing example, where the blade protector sleeve 60 is used as a straight edge to gauge suitable tensioning of the blade, the protector sleeve 60 can be stored within the hollow interior of the frame 10, along with the arms 12, 14; tensioner 16 and blade 18. That is, the dimensional difference by which the frame member's internal width exceeds the thickness of each support arm 12, 14 and the tensioner 16 exceeds the combined thicknesses of the blade 18 and the protective sleeve 60, where both the blade 18 and the sleeve 60 can be stored alongside the stored arms 12, 14 and tensioner 16, whether with the blade disposed inside the protective sleeve, or situated beside and outside the sleeve. Alternatively, the protective sleeve may be omitted, in which case the space inside the frame member 10 previously occupied by such sleeve may instead be occupied by a second blade, whether this second blade might be a matching blade useful as a redundant backup to the first blade for failsafe purposes, or a non-matching blade of differing tooth pattern or character to impart a different operating character to the assembled saw. In the instance of multiple blades, without the protective sleeve that doubles as a tension guide, the appropriate level of tensioning may instead be gauged by use of a specifically prescribed number of final tensioning turns performed on the tensioner once the blade has been pulled taught.

In one non-limiting example, user directions for assembly of the saw, preferably included as printed instructions that accompany the saw at time of purchase, may read as follows: Install the non-tensioning or fixed arm 14 until its engagement slot 36 clicks into place, then do the same with the tensioning arm 12. Place the blade (or either one of the two blades, in the multi-blade scenario) on the mounting lugs 42 using two of the mounting holes 20A, 20B in the blade (or more specifically, the two outermost holes nearest the ends of the blade). Force the tensioning arm 12 outward toward the nearest end 10A of the frame 10 (i.e. to the left, in the illustrated orientation) until the blade is snug. Install the tensioner 16 by first engaging its full hook 56 at this end 10A of the frame 10, then engaging its angled stub hook 58 into the aperture 48 of the tensioning arm 12. Turn the tensioner in its tightening direction until the blade is snug, and then two more complete turns. In this example, the prescribed number of final tensioning turns is two, though this may vary depending on relative dimensions of the components, and the tensioner specs.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A collapsible hand saw comprising:
   an elongated tubular frame member having a first end and a second end situated oppositely of one another in a longitudinal direction of said frame member, a hollow interior that runs longitudinally therethrough, and first and second predefined attachment features defined on said elongated tubular frame member at respective first and second locations situated respectively proximate the first and second ends of the frame member;
   a first arm for attachment to the elongated tubular frame at the first location in an installed position spanning outward therefrom at an underside thereof in a reference position of the collapsible hand saw, said first arm having a respective attachment end at or adjacent which said first arm is configured for engagement to the frame member at the first attachment feature thereof, and a respective mounting end at or adjacent which said first arm is configured for selective coupling to a bowsaw blade at a respective mounting hole therein in the bowsaw blade near a respective first end thereof;
   a second arm for attachment to the elongated tubular frame at the second location in an installed position spanning outward therefrom at the underside thereof, said second arm having a respective attachment end at or adjacent which said second arm is configured for engagement to the frame member at the second attachment feature thereof, and a respective mounting end at or adjacent which said second arm is configured for selective coupling to the bowsaw blade at a respective mounting hole in the bowsaw blade near a respective second end thereof; and
   an adjustable tensioner connectable between the frame member and the first arm at a first tensioner connection point on said first arm and in a position that, when tightened, pulls the respective mounting end of said first arm away from the second arm and toward the first end of the frame member to tension the bowsaw blade;
   wherein the hollow interior of the frame member is sufficiently sized to accommodate simultaneous storage therein of at least the first and second arms, and the adjustable tensioner.

2. The collapsible hand saw of claim 1 wherein each attachment feature of the frame member is a respective hole in a wall of said frame member, and each arm is configured at or near the respective attachment end thereof for hooked engagement with a boundary edge of said respective hole.

3. The collapsible hand saw of claim 2 wherein said respective hole is a top hole in a top wall of the frame member at a topside thereof, and each top hole is accompanied by a respective bottom hole in a bottom wall of the frame member at the underside thereof, said respective bottom hole being sized and positioned to receive passage of the respective arm through said bottom hole into engagement with the respective top hole during attachment of said respective arm to the frame member, whereby each arm spans across the hollow interior of the frame member and through the respective bottom hole thereof in the installed position of the arm.

4. The collapsible hand saw of claim 1 in combination with said bowsaw blade, wherein the hollow interior of the frame member is sufficiently sized to accommodate simultaneous storage therein of the first and second arms, the adjustable tensioner and said bowsaw blade.

5. The collapsible hand saw of claim 1 wherein a length of said hollow interior exceeds a combined length of the first and second arms.

6. The collapsible hand saw of claim 1 wherein a length of said hollow interior exceeds a combined length of the first and second arms and the adjustable tensioner.

7. The collapsible hand saw of claim 1 wherein the first arm has a second tensioner connection point at a different position thereon than said first tensioner connection point, among which the first tensioner connection point is configured to receive connection of the tensioner with the first and second arms in the installed positions, and the second tensioner connection point is configure to receive connection of the tensioner with the first and second arms in a storage arrangement placed end-to-end for simultaneous storage thereof within the hollow interior of the frame member.

8. The collapsible hand saw of claim 7 wherein said first tensioner connection point is an aperture having a beveled countersink.

9. The collapsible hand saw of claim 1 wherein the first tensioner connection point on said first arm comprises a hooking aperture having a beveled countersink.

10. The collapsible hand saw of claim 1 wherein each arm comprises a bent tang formed therein that forms a respective lug over which the respective mounting hole of the blade is receivable to coupled said blade to said arm.

11. The collapsible hand saw of claim 10 wherein said respective lug is non-perpendicular to a face of the arm and slopes toward an outer edge of the arm that faces a respective nearest end of the frame member.

12. A collapsible hand saw comprising:
   an elongated tubular frame member having a first end and a second end situated oppositely of one another in a longitudinal direction of said frame member, and a hollow interior that runs longitudinally therethrough;
   a first pair of holes in said elongated tubular frame at a first location proximate the first end thereof, said first pair of holes comprising a first top hole in a topside of said elongated tubular frame, in a reference position of the hand saw, and a first bottom hole in an opposing underside of said elongated tubular frame;
   a second pair of holes in said elongated tubular frame at a second location proximate the second end thereof, said second pair of holes comprising a second top hole in the topside of said elongated tubular frame and a second bottom hole in the opposing underside of said elongated tubular frame;

a first arm for attachment to the elongated tubular frame at the first location in an installed position spanning outward therefrom at the underside thereof through the first bottom hole, said first arm having a respective attachment end that is insertable through said first bottom hole, and at or adjacent which said first arm is configured for hooked engagement with the frame member at a boundary edge of the first top hole therein, and a respective mounting end at or adjacent which said first arm is configured for selective coupling to a bowsaw blade at a respective mounting hole in the bowsaw blade near a respective first end thereof;

a second arm for attachment to the elongated tubular frame at the second location in an installed position spanning outward therefrom at the underside thereof through said second bottom hole, said second arm having a respective attachment end that is insertable through said second bottom hole, and at or adjacent which said second arm is configured for hooked engagement with the frame member at a boundary edge of the second top hole therein, and a respective mounting end at or adjacent which said second arm is configured for selective coupling to the bowsaw blade at a respective mounting hole in the bowsaw blade near a respective second end thereof; and an adjustable tensioner connectable between the frame member and the first arm at a first tensioner connection point on said first arm and in a position that, when tightened, pulls the respective mounting end of first arm away from the second arm and toward the first end of the frame member to tension the bowsaw blade;

wherein the hollow interior of the frame member is sufficiently sized to accommodate simultaneous storage therein of at least the first and second arms and the adjustable tensioner.

13. The collapsible hand saw of claim 12 wherein a length of said hollow interior exceeds a combined length of the first and second arms.

14. The collapsible hand saw of claim 12 wherein a length of said hollow interior exceeds a combined length of the first and second arms and the adjustable tensioner.

15. The collapsible hand saw of claim 12 wherein the first arm has a second tensioner connection point at a different position thereon that said first tensioner connection point, among which the first tensioner connection point is configured to receive connection of the tensioner with the first and second arms in the installed positions, and the second tensioner connection point is configure to receive connection of the tensioner with the first and second arms in a storage arrangement placed end-to-end for simultaneous storage thereof within the hollow interior of the frame member.

16. The collapsible hand saw of claim 15 wherein said first tensioner connection point is an aperture having a beveled countersink.

17. The collapsible hand saw of claim 12 wherein the first tensioner connection point on said first arm comprises a hooking aperture therein having a beveled countersink.

18. The collapsible hand saw of claim 12 wherein each arm comprises a bent tang formed therein that forms a respective lug over which the respective mounting hole of the blade is receivable to coupled said blade to said arm.

* * * * *